US008392690B2

(12) United States Patent
Chu et al.

(10) Patent No.: US 8,392,690 B2
(45) Date of Patent: Mar. 5, 2013

(54) MANAGEMENT METHOD FOR REDUCING UTILIZATION RATE OF RANDOM ACCESS MEMORY (RAM) USED IN FLASH MEMORY

(75) Inventors: Yuan-sheng Chu, Wugu Township (TW); Jen-wei Hsieh, Taipei (TW); Yuan-hao Chang, Tainan (TW); Tei-wei Kuo, Taipei (TW); Cheng-chih Yang, Taipei (TW)

(73) Assignee: Genesys Logic, Inc., Shindian (TW)

( * ) Notice: Subject to any disclaimer, the term of this patent is extended or adjusted under 35 U.S.C. 154(b) by 318 days.

(21) Appl. No.: 11/961,136

(22) Filed: Dec. 20, 2007

(65) Prior Publication Data

US 2008/0162793 A1 Jul. 3, 2008

(30) Foreign Application Priority Data

Dec. 28, 2006 (TW) ................................ 95149556 A

(51) Int. Cl.
*G06F 12/00* (2006.01)

(52) U.S. Cl. ........ 711/203; 711/207; 711/216; 711/220; 711/221; 711/E12.058; 711/E12.06

(58) Field of Classification Search .................. 711/202, 711/203, 206, 207, 216, 220, 221
See application file for complete search history.

(56) References Cited

U.S. PATENT DOCUMENTS

| 4,334,285 | A | * | 6/1982 | Kawakita et al. | ............. | 708/650 |
| 6,581,132 | B1 | * | 6/2003 | Kakinuma et al. | ............. | 711/103 |
| 6,587,915 | B1 | * | 7/2003 | Kim | ............................. | 711/103 |
| 7,003,621 | B2 | * | 2/2006 | Koren et al. | .................. | 711/103 |

* cited by examiner

*Primary Examiner* — Jared Rutz
*Assistant Examiner* — Gurtej Bansal

(57) ABSTRACT

A management method for reducing the utilization rate of random access memory (RAM) while reading data from or writing data to the flash memory is disclosed. A physical memory set is constructed from a plurality of physical memory blocks in the flash memory. A logical set is constructed from a plurality of logical blocks wherein the data stored in the logical set are stored in the physical memory set. Further, the data stored in each of the logical blocks are stored in one number of physical memory blocks. A mapping table is constructed and includes a hash function, a logical set table, a physical memory set table, and a set status table for managing the relationship among the physical memory sets, physical memory blocks, and logical blocks while reading data from or writing data to the flash memory. Further, the management method operates and maintains the physical memory sets, the physical memory blocks, and the logical blocks at a set level so that the utilization rate of random access memory is reduced to decrease the access capacity of the random access memory while operating the physical memory blocks and the logical blocks of the flash memory.

5 Claims, 13 Drawing Sheets

Status presentation sequence

MANAGEMENT METHOD FOR REDUCING UTILIZATION RATE OF RANDOM ACCESS MEMORY (RAM) USED IN FLASH MEMORY

FIELD OF THE INVENTION

The present invention relates to a method for managing the utilization rate of memory, and more particularly to a management method for reducing the utilization rate of random access memory (RAM) to decrease the access capacity of the random access memory while reading data from or writing data to the flash memory.

BACKGROUND OF THE INVENTION

Regarding the technical field of the conventional flash memory, the architecture of flash memory includes a flash memory chip having a plurality of physical flash memory planes. Further, one of physical flash memory planes is composed of hundreds of flash memory blocks wherein the memory capacity of a flash memory block is in a range from 16 KB to 128 KB.

Please refer to FIG. 1. FIG. 1 is a management architecture of the conventional flash memory. There are many kinds of management methods of the flash memory. However, while implementing the management methods, it is required to establish a mapping table (abbreviated as "MT", or named as address translation table) having logical addresses (LAS) and physical addresses (PAS) in the flash memory. Furthermore, before using the flash memory, it is necessary to construct a mapping table and store the mapping table in the random access memory (RAM) to be inquired so that the flash memory can be operated in the manner of management architecture shown in FIG. 1. However, considering the manufacturing cost of the flash memory, the capacity of the random access memory (RAM) is limited. Thus, if the storage space for storing the mapping table is greater than the physical storage space of the random access memory (RAM), the management method of the flash memory needs to be changed.

Please refer to FIG. 2. FIG. 2 is a flow chart of management method of the conventional flash memory. The management method adopts the way of on-demand fetching. That is, when the host submits an inquiry request, the management method constructs a mapping table partially associated with the inquiry request, or fetches the mapping table partially associated with the inquiry request to be stored in the random access memory (RAM). The management method then starts to inquire the mapping table. Therefore, it is not necessary to save the whole mapping table to the random access memory (RAM). The detailed steps are described as follows:

(1A) Start.

(2A) The host issues an access command to access the flash memory and assigns a logical access address.

(3A) The method checks the partial mapping table stored in the random access memory (RAM).

(4A) The method identifies the partial mapping table to check whether the information corresponding to the logical access address is stored. If yes, go to step (5A), and if no, proceed to step (4A1).

(4A1) The method constructs the partial mapping table having the information corresponding to the logical access address or reads the partial mapping table from the flash memory.

(4A2) The method saves the partial mapping table to the random access memory (RAM) to be inquired. If the capacity of the random access memory (RAM) is exhausted, the temporarily unused portion of the partial mapping table is erased.

(5A) The method inquires the mapping table to acquire the physical addresses corresponding to the logical access address.

(6A) The method access the flash memory based on the physical addresses.

(7A) End.

However, for the purpose of decreasing the access response time by reducing the time of the on-demand fetching when constructing the partial mapping table, it is required to divide the mapping table into a plurality of regions and only a portion of regions correspond to a specific range of physical memory addresses. While the host reads the data on the specific range, the specific range of physical memory addresses is scanned in order to construct the partial mapping table including the specific range of physical memory addresses.

As shown in FIG. 3, a plurality of logical blocks having a smaller address range corresponds to a flash memory plane having a greater address range. For example, a flash memory plane is composed of the amount of 512 physical memory blocks (PBA), which are assigned as the numbers "0" to "511". A plurality of logical blocks (LAB) are assigned as the numbers "0" to "499" and total amount of logical blocks is 500. The logical blocks (LAB) corresponds to the physical memory blocks. The additional twelve physical memory blocks serves as the function of out-place update or as a buffer region if some bad blocks are located within the physical memory blocks (PBA). The term of out-place update means that the new data is written to different regions for reducing the updated time when updating a new memory block. The bad clocks are native defects in the flash memory after the flash memory are manufactured or used. FIG. 3 shows the partial mapping table in the mapping table to be inquired by the logical blocks (LAB) including numbers "0" to "499".

If the host accesses a block, e.g. number "496", in the logical block (LAB) and the mapping table shown in FIG. 3 is not stored in the random access memory (RAM), it is required to scan numbers "0" to "511" of the physical memory blocks (PBA) in the flash memory for constructing the mapping table within the random access memory (RAM). Then, the host inquires the mapping table and identifies that the data of the number "496" in the logical block (LAB) is stored in the number "69" of the physical memory blocks (PBA). Finally, the data of the number "69" in the physical memory blocks (PBA) can be accessed.

The feature of the above-mentioned method is only applicable to the random access memory (RAM) with the limited capacity. The disadvantage is that it takes a lot of time to make on-demand fetching or scan the flash memory for constructing different partial mapping tables when the addresses accessed by the host are variable from time to time. Moreover, such situation becomes more severe if the capacity of the flash memory is increased.

Additionally, within the physical memory blocks (PBA) of the partial mapping table, if the amount of bad blocks in the physical memory blocks (PBA) is greater than the amount of the effective blocks in the partial mapping table, some logical blocks (LAB) cannot correspond to the addresses of the physical memory blocks (PBA), thereby resulting in data-storing errors of the flash memory. Further, the file system of the flash memory is damaged and all the data are thus lost. For example, if there are twelve or more bad blocks of the physical memory blocks (PBA) in the flash memory plane, the above situation occurs.

SUMMARY OF THE INVENTION

One objective of the present invention is to provide a management method for reducing the utilization rate of random access memory (RAM) while reading data from or writing data to the flash memory so that the requirement of the random access memory is decreased to be applicable to the portable device having limited random access memory (RAM).

Another objective of the present invention is to provide a management method for reducing the utilization rate of random access memory while reading data from or writing data to the flash memory. If the bad blocks in the flash memory exceeds a predetermined threshold amount, e.g. twelve bad blocks in a physical flash memory plane, the management method is capable of maintaining the data-accessing reliable and correct.

According to the objectives, the present invention sets forth a management method for reducing the utilization rate of random access memory while reading data from or writing data to the flash memory. A physical memory set is constructed from a plurality of physical memory blocks in the flash memory. A logical set is constructed from a plurality of logical blocks wherein the data stored in the logical set are stored in the physical memory set. Further, the data stored in each of the logical blocks are stored in one number of physical memory blocks. A mapping table is constructed and includes a hash function, a logical set table, a physical memory set table, and a set status table for managing the relationship among the physical memory sets, physical memory blocks, and logical blocks while reading data from or writing data to the flash memory. Further, the management method operates and maintains the physical memory sets, the physical memory blocks, and the logical blocks at a set level so that the utilization rate of random access memory is reduced to decrease the access capacity of the random access memory while operating the physical memory blocks and the logical blocks of the flash memory. Therefore, the management method is capable of reducing the utilization rate of random access memory to increase the reliability and correctness of the data-accessing procedures.

BRIEF DESCRIPTION OF THE DRAWINGS

The foregoing aspects and many of the attendant advantages of this invention will become more readily appreciated as the same becomes better understood by a reference to the following detailed description, when taken in conjunction with the accompanying drawings, wherein.

DETAILED DESCRIPTION OF THE INVENTION

Figure 4:
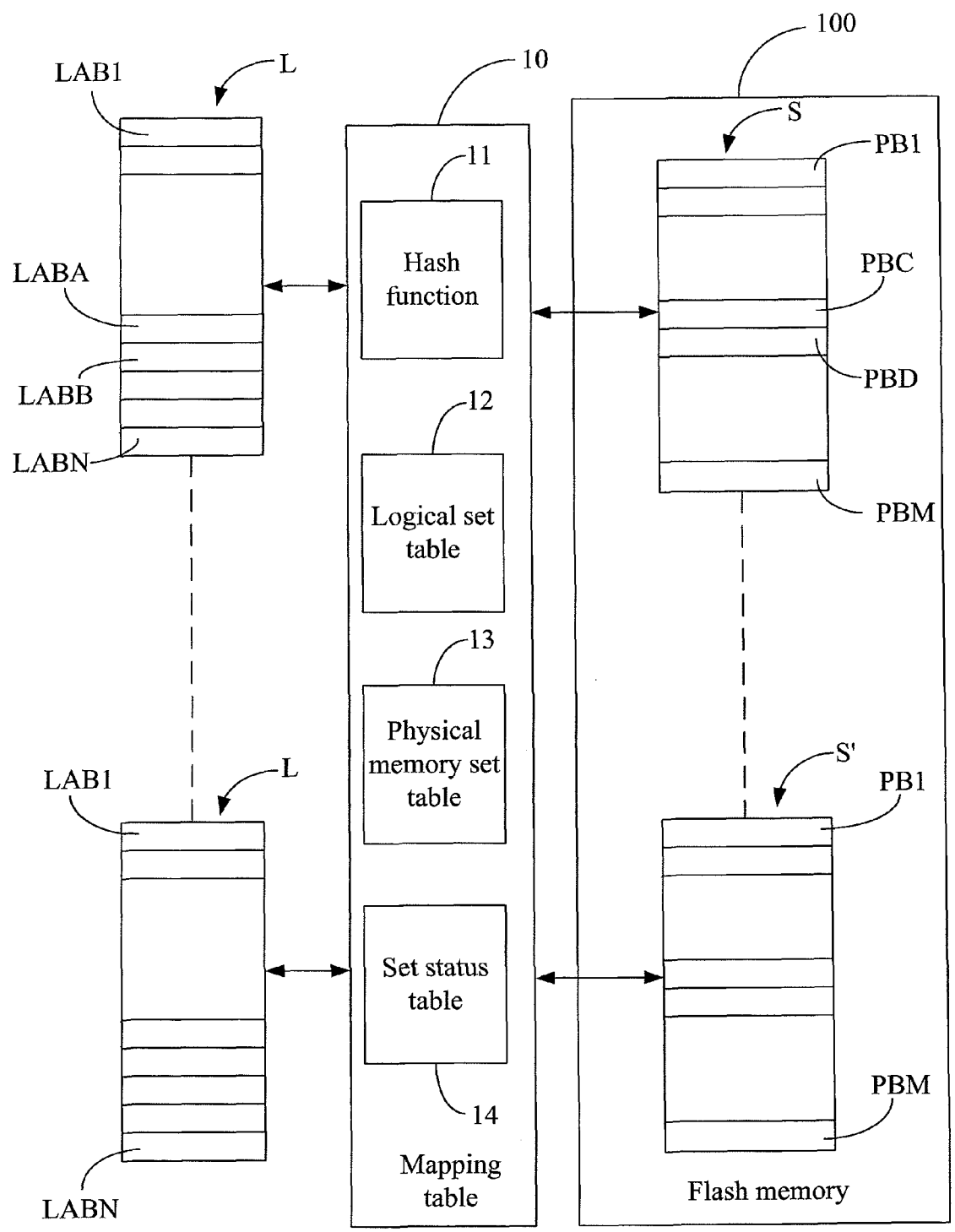
FIG. 4 illustrates an architecture definition view of the flash memory according to one embodiment of the present invention.

Please refer to FIG. 4. FIG. 4 illustrates an architecture definition view of a management method used in flash memory for reducing the utilization rate of random access memory (RAM) according to one embodiment of the present invention. The physical memory set "S" or "S'" includes the amount "m" of physical memory blocks "PB1" to "PBM" in the flash memory 100, and the logical set "L" or "L'" includes the amount "n" of logical blocks "LAB1" to "LABN". The data in the same logical set are stored in the same physical memory set wherein the amount "n" is smaller than or equal to the amount "m". The data stored in each of the logical blocks "LAB1" to "LABN" are not necessarily stored in a specific number of physical memory blocks.

That is, while writing or updating a logical block "LABA", the logical block address (LBA) corresponds to the physical memory set "S" after inquiring a mapping table 10. The mapping table 10 includes a hash function 11, a logical set table 12, a physical memory set table 13, and a set status table 14.

If the logical block "LABA" has no written data, one physical memory block "PBC" is selected from the physical memory set "S" and the data are written to the physical memory block "PBC". If the logical block "LABA" has written data and the written data are stored in the physical memory blocks "PBC" of the physical memory set "S", and the physical memory set "S" includes another unused physical memory block "PBD", new data are written into the physical memory block "PBD" and the content of the physical memory block "PBC" are set as invalidation status. In this case, if there is no physical memory blocks "PB1" to "PBM" in the physical memory set "S", the management method performs a step of garbage collection. In other words, the management method searches an unused physical memory set "S'" in the flash memory 100 and copies the effective data stored in the physical memory blocks "PB1" to "PBM" of the physical memory set "S" to the unused physical memory set "S'". Then, the physical memory set "S" is released and the management method starts to update the mapping table 10.

Figure 5:
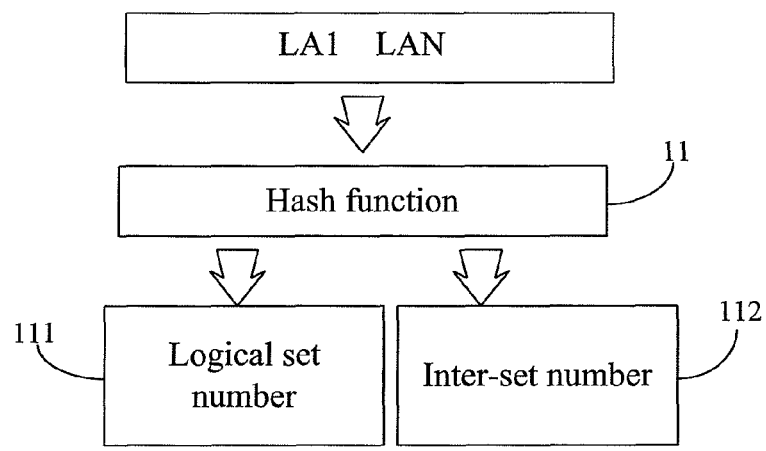
FIG. 5 illustrates a data architecture view of the hash function in the mapping table according to one embodiment of the present invention.

FIG. 5 illustrates a data architecture view of the hash function 11 in the mapping table 10 of a management method used in flash memory for reducing the utilization rate of random access memory according to one embodiment of the present invention. The hash function 11 serves as a divider for receiving the logical addresses "LA1" to "LAN" from the logical blocks "LAB1" to "LABN" to be the input values. After the divider performs the dividing operation, the hash function 11 outputs two values including a quotient, i.e. logical set number 111, and a remainder, i.e. an inter-set number 112.

Figure 6:
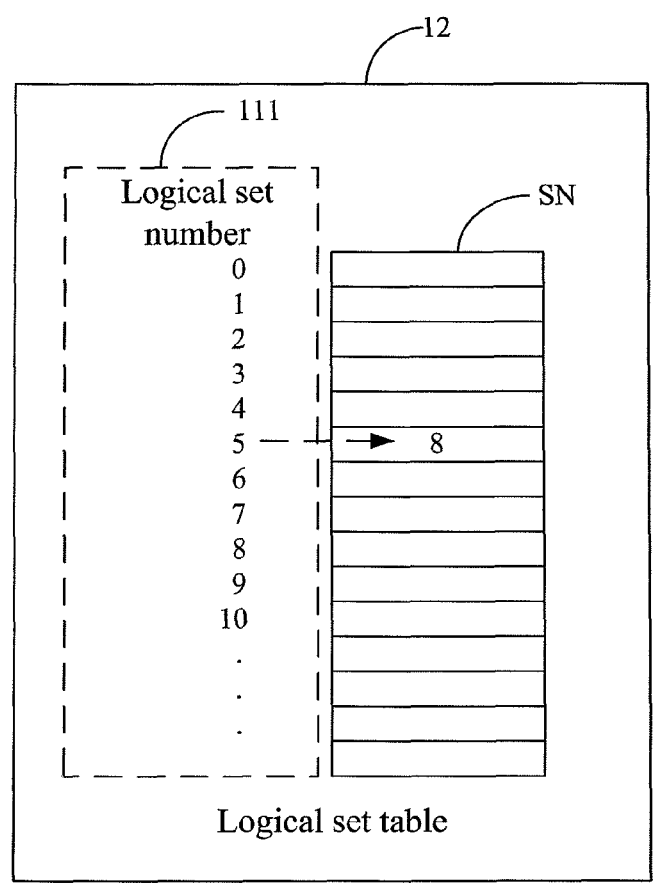
FIG. 6 illustrates a data architecture view of the logical set table in the mapping table according to one embodiment of the present invention.

FIG. 6 illustrates a data architecture view of the logical set table 12 in the mapping table 10 of the management method used in the flash memory for reducing the utilization rate of random access memory according to one embodiment of the present invention. The logical set table 12 records each of the physical memory set numbers "SN" in the physical memory set "S" corresponding to each logical set number 111. As shown in FIG. 6, the fifth logical set number 111 corresponds to the eighth physical memory set number "SN".

Figure 7:
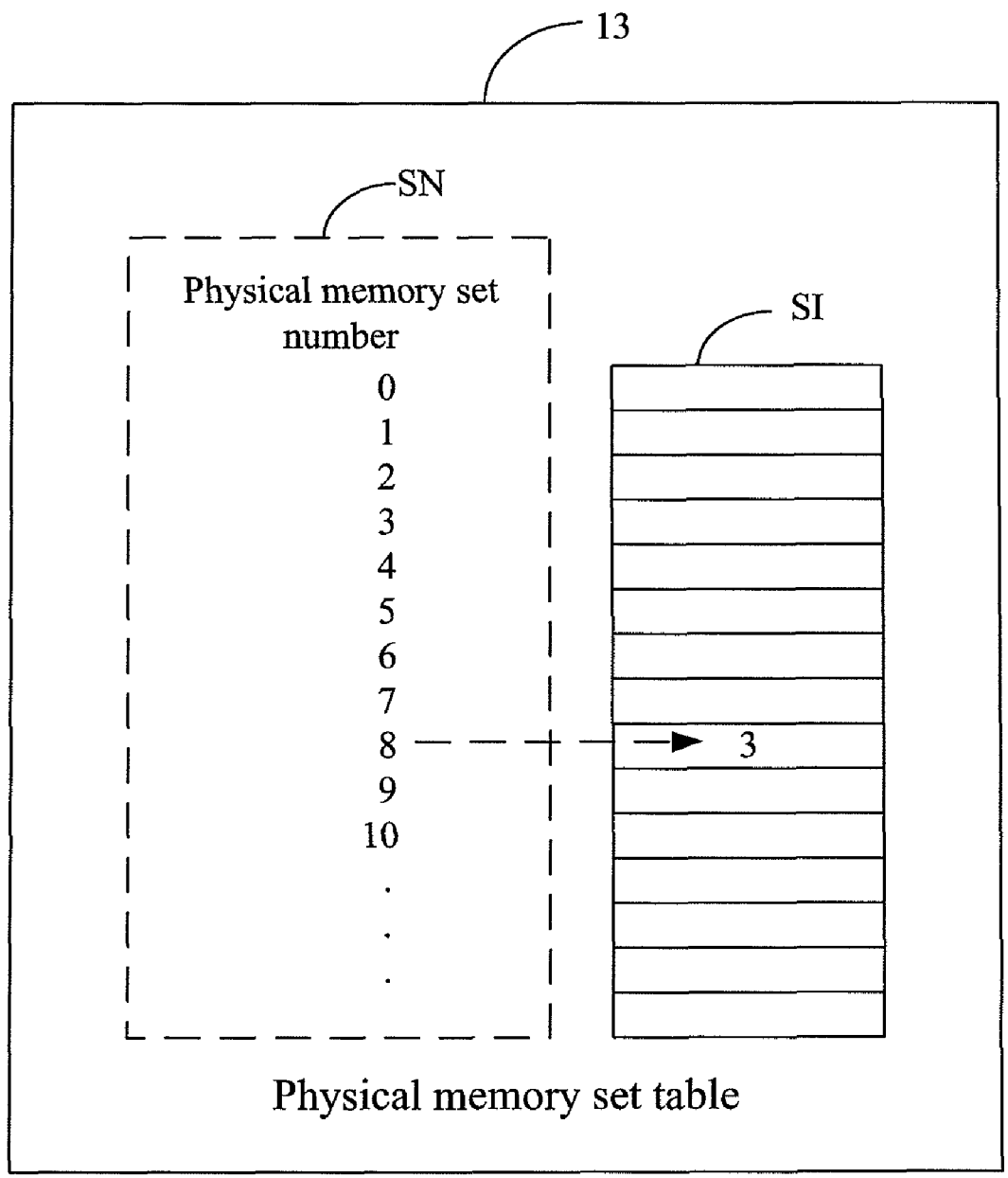
FIG. 7 illustrates a data architecture view of the physical memory sets in the mapping table according to one embodiment of the present invention.

FIG. 7 illustrates a data architecture view of the physical memory set table 13 in the mapping table 10 of the management method used in the flash memory for reducing the utilization rate of random access memory according to one embodiment of the present invention. The physical memory set table 13 records each current set status index "SI" of each physical memory set numbers "SN". As shown in FIG. 6, the current set status index "SI" of the eighth physical memory set numbers "SN" is "3".

Figure 1:
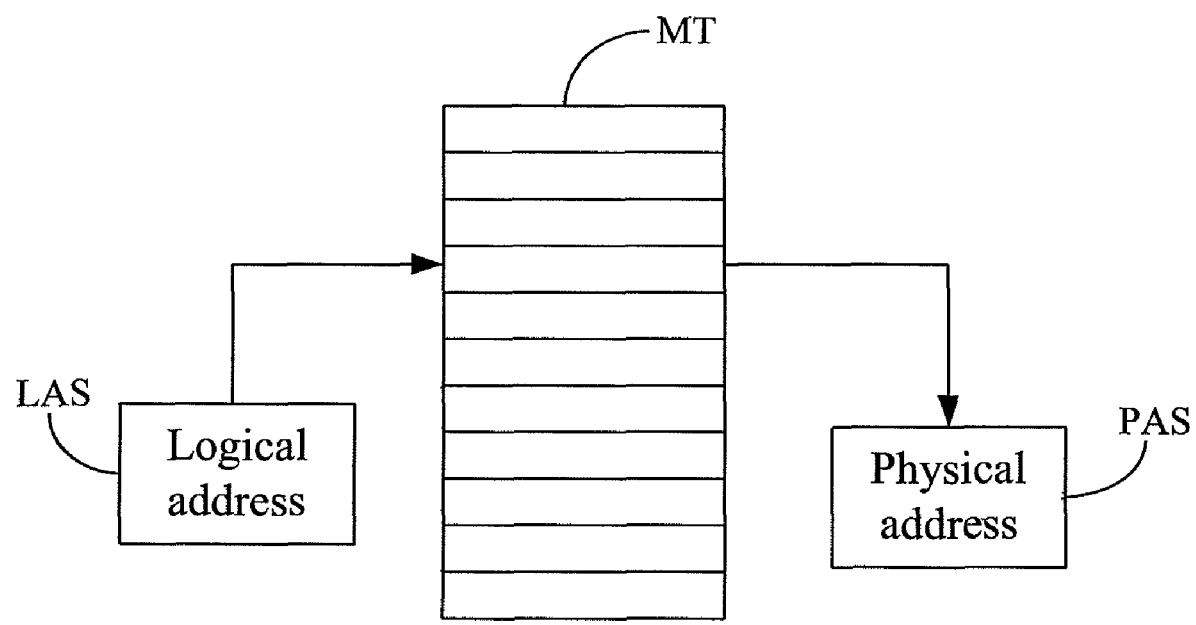
FIG. 1 is a management architecture of the conventional flash memory.
Figure 2:
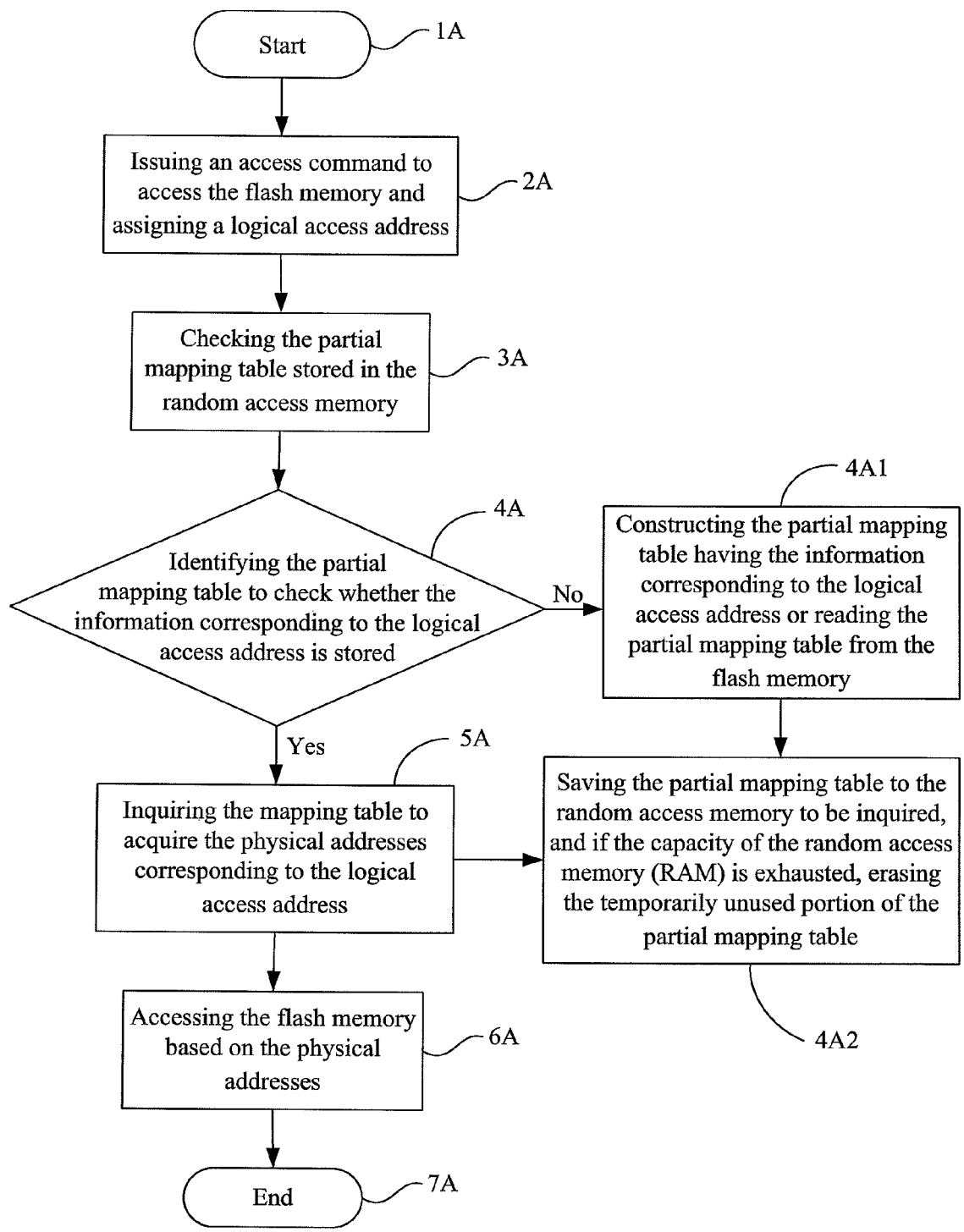
FIG. 2 is a flow chart of management method of the conventional flash memory.
Figure 3:
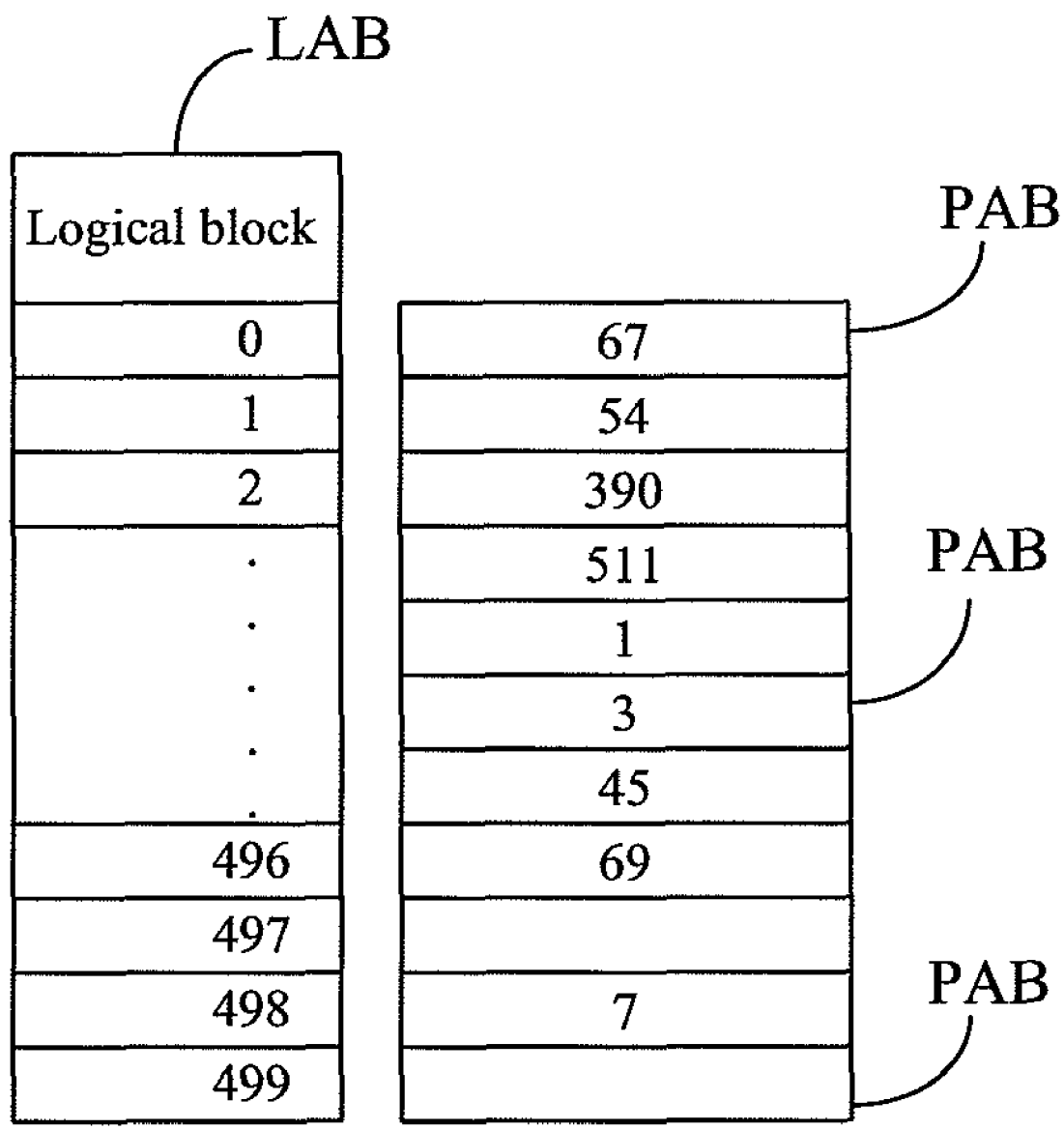
FIG. 3 is a mapping table of physical memory blocks and logical blocks in the conventional flash memory.
Figure 8A:
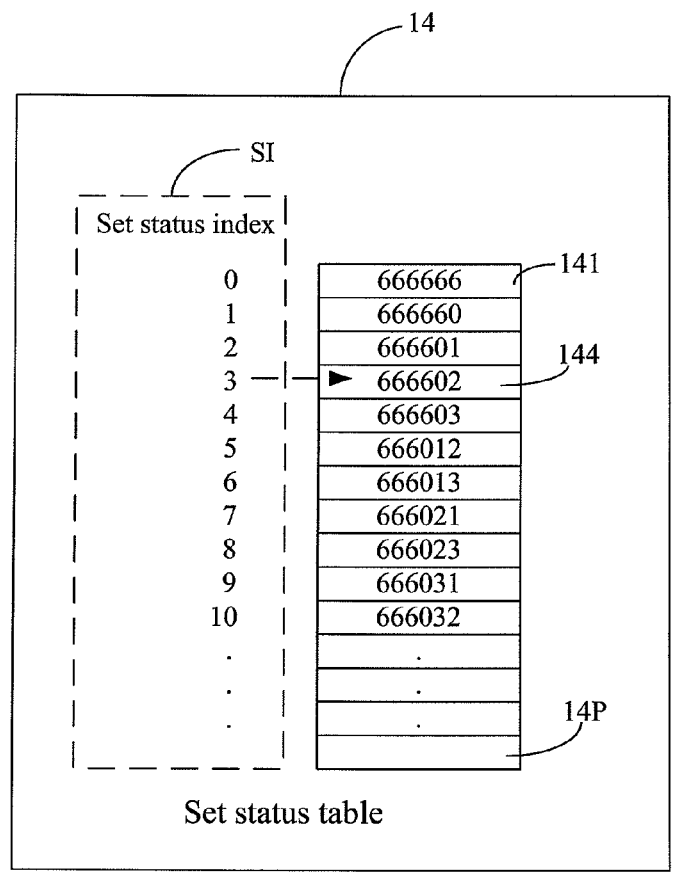
FIG. 8A illustrates a data architecture view of the set status table in the mapping table according to one embodiment of the present invention.
Figure 8B:
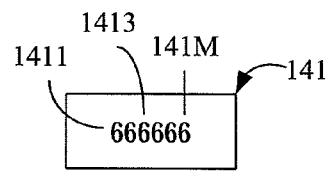
FIG. 8B illustrates a data architecture view of the status presentation sequence of the set status table according to one embodiment of the present invention.

Please refer to FIGS. 8A and 8B. FIG. 3A illustrates a data architecture view of the set status table 14 in the mapping table 10 of the management method used in the flash memory for reducing the utilization rate of random access memory according to one embodiment of the present invention. FIG. 8B illustrates a data architecture view of the status presentation sequence of the set status table according to one embodiment of the present invention. The data-storing statuses associated with the physical memory sets "S" and "S'" are listed in the set status table 14 to be inquired by one set status index "SI". In one embodiment, since the content listed in the set status table 14 is invariant, the set status table 14 can be written to the driver or firmware and recorded into the read-only memory (ROM), wherein the driver or firmware is capable of controlling the flash memory. In another case, the set status table 14 can be immovably written to the memory transformation layer of the flash memory. The set status table 14 is described as follows:

(1) If the amount "n" of logical blocks "LAB1" to "LABN", i.e. one logical set, corresponds a physical memory set "S" or "S'" including the amount "m" of physical memory blocks wherein the amount "n" is smaller than the amount "m", the hash function 11 operates one of the logical addresses "LA1" to "LAN" and generates an inter-set number 112 which is an integer between 0 and (n−1).

(2) The data-storing statuses of the physical memory set "S" or "S'" are stored in the set status table 14. FIG. 8A shows the amount "P" of data-storing statuses wherein each data-storing status is represented by one of the status presentation sequences "141" to "141P".

(3) Referring to FIG. 8B, a status presentation sequence "141" has the amount "m" of status presentation elements "1411" to "141M" The length of each of the presentation elements "1411" to "141M" is represented by the formula (unit: bits): Ceiling (log (n+2)), and thus the length of the status presentation sequence "141" is represented by the formula (unit: bits): m×Ceiling (log (n+2)). If the length is represented by decimal format, the value of each of status presentation elements "1411" to "141M" is an integer between zero and (n+1). For an example of the set status table 14 in FIG. 8A, four logical blocks are mapped to the physical memory set "S" having six physical memory blocks "PB1" to "PB6". Further, the integer "6" represents the unused physical memory blocks and the integer "7" represents the physical memory blocks with invalidation or bad blocks. If the set status index "SI" of the physical memory set "S" is "3", the status presentation sequence 144 is "666602" after inquiring the mapping table. That is, the first physical memory block "PB1" of the physical memory set "S" includes the number "2" of logical block in the inter-set number 112, the second physical memory block "PB2" includes the number "0" of logical block in the inter-set number 112 and the rest of physical memory blocks are unused.

Figure 9:
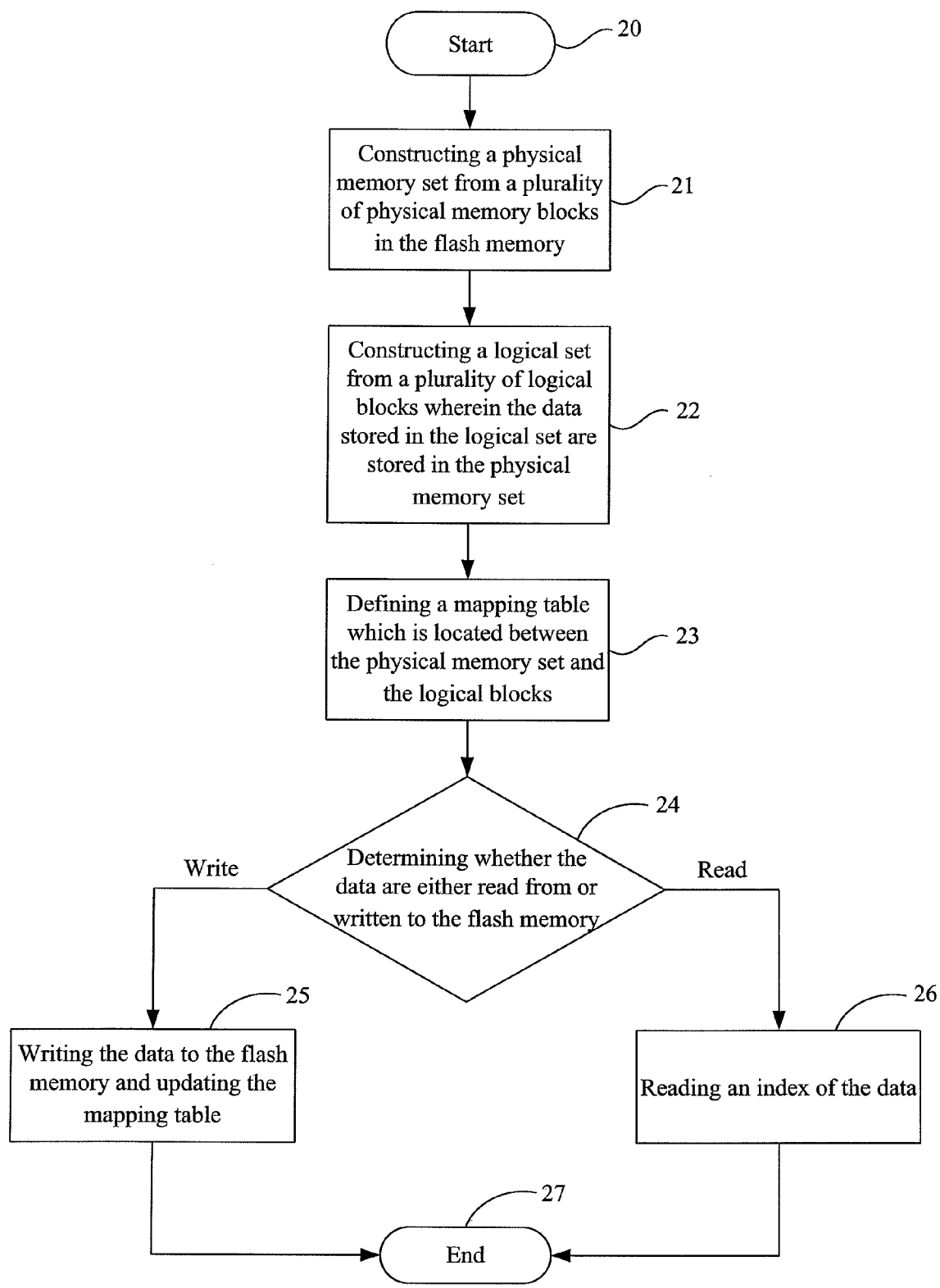
FIG. 9 is a flow chart of management method for reducing the utilization rate of the random access memory (RAM) in the flash memory according to one embodiment of the present invention.

FIG. 9 is a flow chart of management method for reducing the utilization rate of the random access memory in the flash memory according to one embodiment of the present invention. The management method includes the following steps (20) to (27):

(20) Start.

(21) A plurality of physical memory blocks in the flash memory constructs a physical memory set.

(22) A plurality of logical blocks constructs a logical set and the data stored in the same logical set are stored in the same physical memory set. The data stored in the amount "n" of logical blocks "LAB1" to "LABN" of the logical set "L" or "L'" are stored in the same physical memory set "S" or "S'". Further, the data stored in each of the logical blocks "LAB1" to "LABN" are not necessarily stored in a specific number of physical memory blocks.

(23) A data-accessing table is defined and located between the logical block and the physical memory set. During the step (22), a mapping table 10 is defined and located between the physical memory set "S" or "S'" and the logical blocks LAB1 to LABN. The mapping table 10 includes a hash function 11, a logical set table 12, a physical memory set table 13, and a set status table 14.

(24) The management method determines whether the data are read from or written to the flash memory 100. If the data are read, proceed to step (25). If the data are written, proceed to step (26).

(25) The management method writes the data to the flash memory 100 and updates the mapping table 10. Based on the relationship of the mapping table between the physical memory set "S" or "S'" and the logical blocks, "LAB1" to "LABN", the data are written to the flash memory 100 and the mapping table 10 is updated.

(26) The management method reads the data indices. Based on the relationship of the mapping table between the physical memory set "S" or "S'" and the logical blocks "LAB1" to "LABN", the management method reads the data from the flash memory 100.

(27) End.

Figure 10:
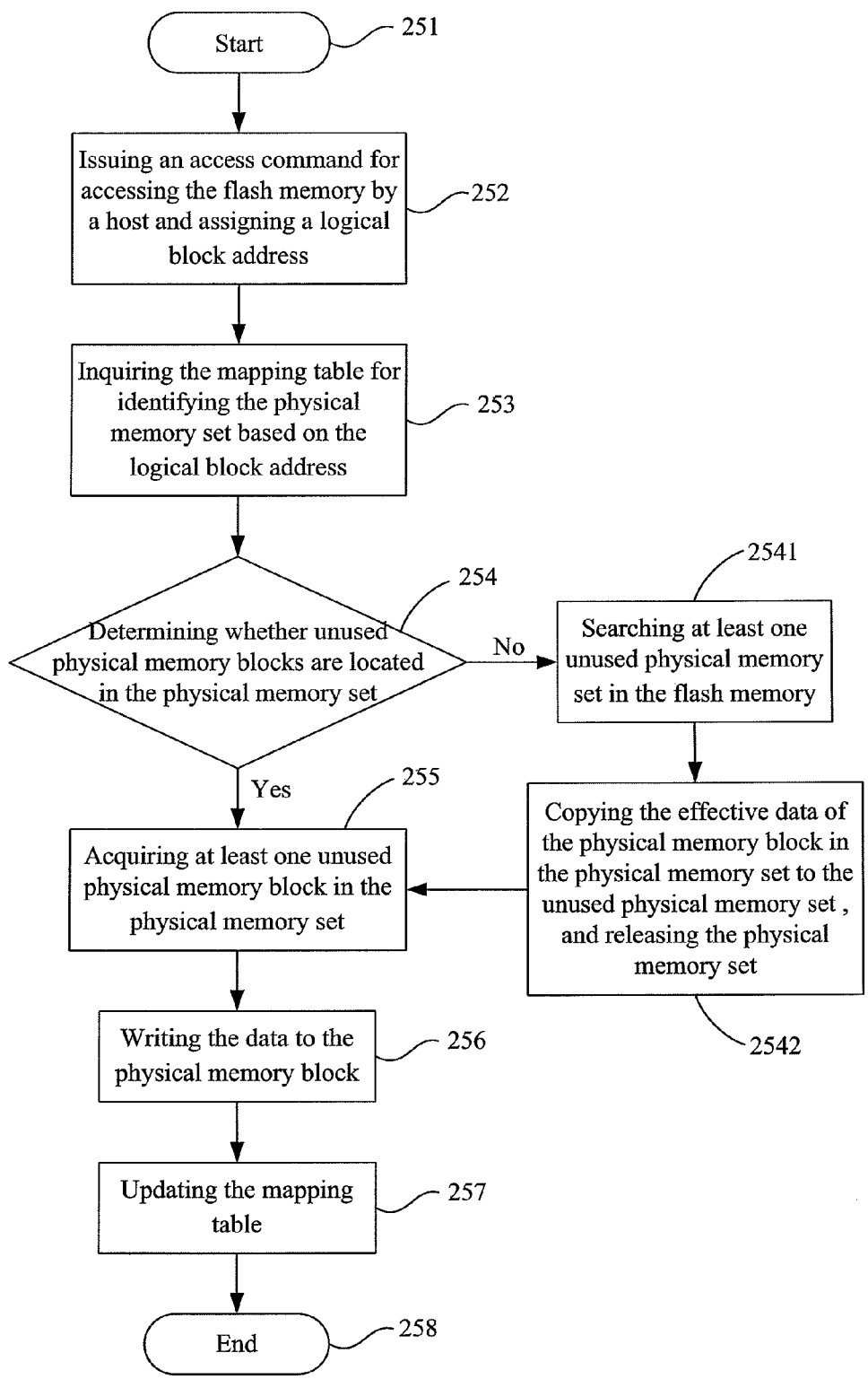
FIG. 10 is a flow chart of writing data and updating the mapping table according to one embodiment of the present invention.

FIG. 10 is a flow chart of writing data and updating the mapping table according to one embodiment of the present invention. The flow chart in FIG. 10 shows the detailed procedures in step (25) of FIG. 9 and further includes the following steps (251) to (259):

(251) Start.

(252) The host issues an access command to access the flash memory and assigns a specific logical block address. That is, the host issues the access command and writes the accessed data to at least one of the logical blocks "LAB1" to "LABN".

(253) The management method inquires the mapping table 10 to identify the corresponding physical memory set based on the logical block address. In other words, based on the logical addresses "LA1" to "LAN" from the logical blocks "LAB1" to "LABN" in step (252), the management method inquires the mapping table 10 to identify the physical memory set "S" or "S'".

(254) The management method determines whether unused physical memory blocks are located in the physical memory set "S" or "S'". If yes, proceed to step 255, and if no, proceed step 2541.

(2541) The management method searches at least one unused physical memory set. That is, the management method searches the unused physical memory set "S'", as shown in FIG. 4.

(2542) The management method copies the effective data of the physical memory block in the original physical memory set to the unused physical memory set and releases the original physical memory set. In other words, the management method copies the effective data stored in the physical memory block "PA1" to "PAM" of the physical memory set "S" to the physical memory blocks "PB1" to "PBM" of the unused physical memory set "S'" during the step (2541).

(255) The management method acquires at least one unused physical memory block in the physical memory set. That is, during the step (2542) or (253), the management method acquires unused one of physical memory blocks "PB1" to "PBM" in the unused physical memory set "S'".

(256) The management method writes the data to the physical memory block. That is, the management method writes the data to unused one of the physical memory blocks "PB1" to "PBM" during step (255).

(257) The management method updates the mapping table. That is, the management method updates the hash function 11, the logical set table 12, the physical memory set table 13, and the set status table 14 of the mapping table 10.

(258) End.

Figure 11A:
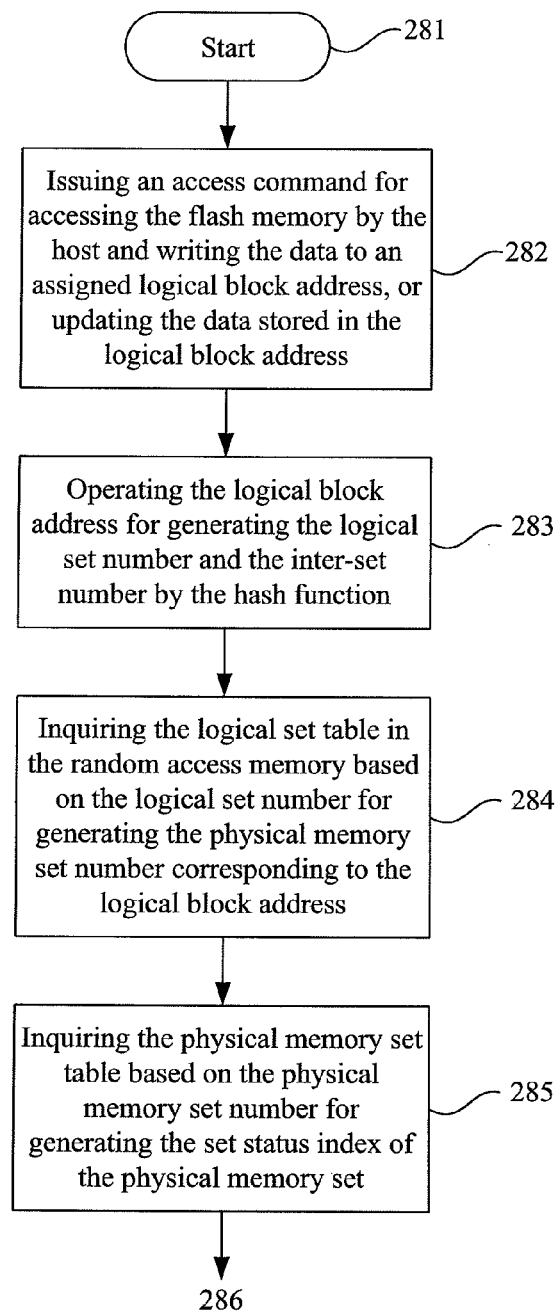
FIGS. 11A-11B are detailed flow charts of writing the updated mapping table according to one embodiment of the present invention.
Figure 11B:
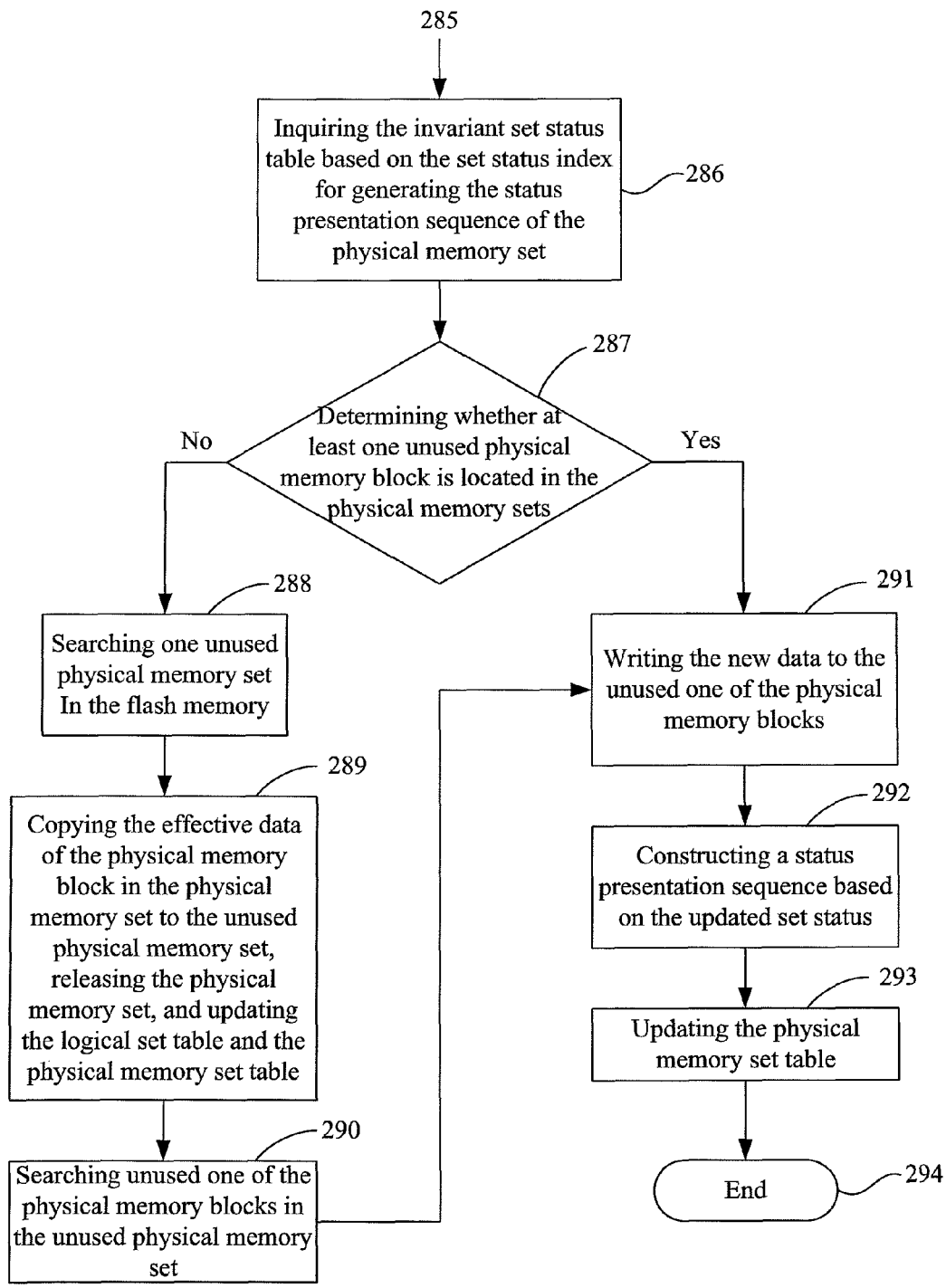

FIGS. 11A-11B are detailed flow charts of writing the updated mapping table according to one embodiment of the present invention. The flow chart in FIGS. 11A-11B show the detailed procedures in step (257) of FIG. 10 and further includes the following steps (281) to (294):

(281) Start.

(282) The host issues an access command to access the flash memory and writes the data to an assigned logical block address or updates the data stored in a logical block address.

(283) The hash function operates the logical block address to generate the logical set number and the inter-set number.

(284) Based on the logical set number the management method inquires the logical set table 12 in the random access memory for generating the physical memory set number "SN" corresponding to the logical block address.

(285) Based on the physical memory set number, the management method inquires the physical memory set table 13 for generating the set status index of the physical memory set.

(286) Based on the set status index, the management method inquires the invariant set status table 14 for generating the status presentation sequence of the physical memory set.

(287) The management method determines whether at least one unused physical memory block is located in the physical memory sets. If no, proceed to step 288, and if yes, proceed step 291.

(288) The management method searches one unused physical memory set.

(289) The management method copies the effective data of the physical memory block in the original physical memory set to the unused physical memory set, releases the original physical memory set, and updates the logical set table and the physical memory set table.

(290) The management method searches unused one of the physical memory blocks in the unused physical memory set.

(291) The new data are written to the unused one of the physical memory blocks.

(292) Based on the updated set status, a status presentation sequence is constructed.

(293) The management method updates the physical memory set table.

(294) End.

Figure 12A:
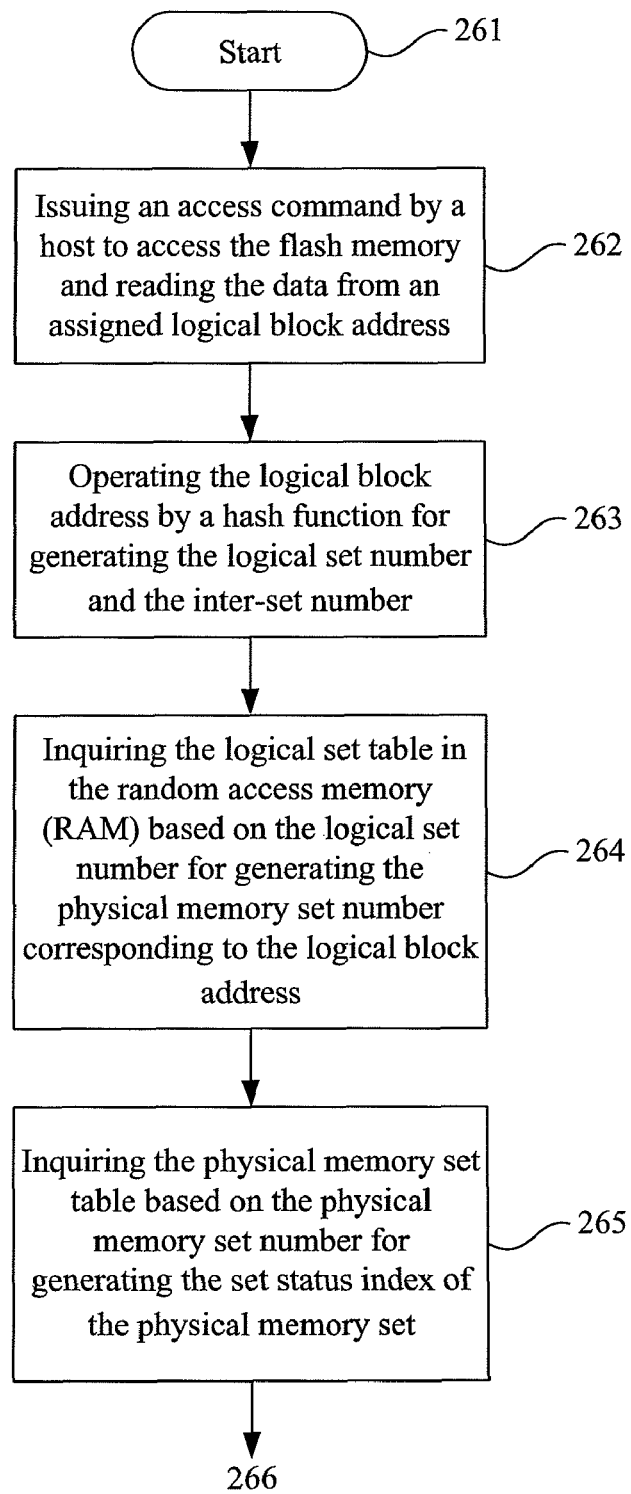
FIGS. 12A-12B are detailed flow charts of reading the data indices according to one embodiment of the present invention.
Figure 12B:
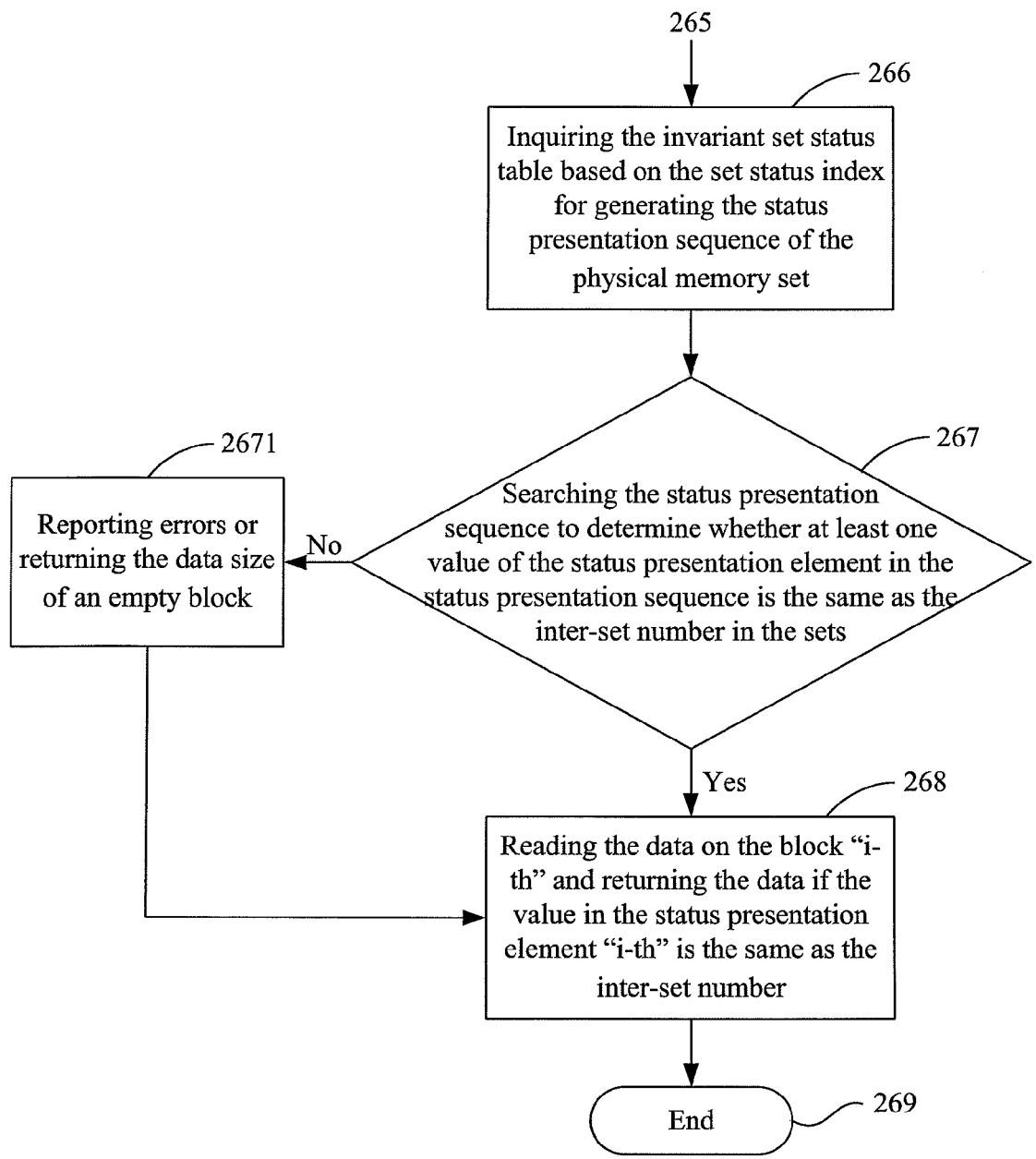

FIGS. 12A-12B are detailed flow charts of reading the data indices according to one embodiment of the present invention. The flow charts in FIGS. 12A-12B shows the detailed procedures in step (26) of FIG. 9 and further includes the following steps (261) to (269):

(261) Start.

(262) The host issues an access command to access the flash memory and reads the data from an assigned logical block address.

(263) The hash function operates the logical block address to generate the logical set number and the inter-set number. That is, the hash function 11 in the mapping table 10 makes an operation to generate the logical set number 111 and the inter-set number 112.

(264) Based on the logical set number, the management method inquires the logical set table 12 in the random access memory for generating the physical memory set number corresponding to the logical block address. That is, based on the logical set number 111 in step (263), the management method inquires the logical set table 12 in the random access memory for generating the physical memory set number "SN".

(265) Based on the physical memory set number, the management method inquires the physical memory set table 13 for generating the set status index of the physical memory set. That is, based on the physical memory set number "SN", the management method inquires the physical memory set table 13 for generating the set status index "SI".

(266) Based on the set status index, the management method inquires the invariant set status table 14 for generating the status presentation sequence of the physical memory set. That is, based on the set status index "SI" in step (265), the management method inquires the set status table 14 for generating the status presentation sequence 141.

(267) The management method searches the status presentation sequence to determine whether at least one value of the status presentation element in the status presentation sequence is the same as the inter-set number 112 in the sets. If yes, proceed step 268, and if no, proceed to step (2671).

(2671) The management method reports errors or returns the data size of an empty block and proceeds to step (269).

(268) If the value in the status presentation element "i-th" is the same as the inter-set number, the management method reads the data on the block "i-th" and returns the data.

(269) End.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A management method for reducing the utilisation rate of random access memory (RAM) utilized in flash memory, the method comprising the steps of:
  (a) constructing a physical memory set from a plurality of physical memory blocks in the flash memory;
  (b) constructing a logical set from a plurality of logical blocks wherein the data stored in the logical set are stored in the physical memory set during the step (a), and the data stored in each of the logical blocks in the logical set are stored in one number of physical memory blocks of the physical memory set;
  (c) defining a data-accessing table which is located between the logical block and the physical memory set and defining a mapping table which is located between the physical memory set and the logical blocks during the step (b), wherein the mapping table comprises a hash function, a logical set table, a physical memory set table, and a set status table, wherein the physical memory set table records a plurality of set status indexes corresponding to a plurality of physical memory sets, and a plurality of data-storing statuses associated with the physical memory sets are listed in the set status table to be inquired by the set status indexes, and wherein a quotient of the hash function based on the logical blocks is a logical set number, and a remainder of the hash function is an inter-set number;

(d) determining whether the data are either read from or written to the flash memory, wherein if the data are read from the flash memory, proceed to step (f), and if the data are written to flash memory, proceed to step (e);

(e) writing the data to the flash memory and updating the mapping table, wherein the data are written to the flash memory and the mapping table is updated based on the relationship of the mapping table between the physical memory set and the logical blocks; and (f) reading an index of the data, wherein the data stored in the flash memory are read based on the relationship of the mapping table between the physical memory set and the logical blocks.

2. The method of claim 1, wherein the hash function of the mapping table in step (d) is a divider.

3. The method of claim 1, during the step (e), further comprising the steps of:

(e1) issuing an access command for accessing the flash memory by a host and assigning a logical block address, wherein the host issues the access command and writes the accessed data to at least one of the logical blocks;

(e2) inquiring the mapping table for identifying the physical memory set based on the logical block address during the step (e1);

(e3) determining whether unused physical memory blocks are located in the physical memory set, wherein if yes, proceed to step (e4), and if no, proceed step (e31);

(e31) searching at least one unused physical memory set;

(e32) copying the effective data of the physical memory block in the physical memory set to the unused physical memory set during the step (e31), and releasing the physical memory set;

(e4) acquiring at least one unused physical memory block in the physical memory set during the step either (e32) or (e2);

(e5) writing the data to the physical memory block for recording the data to unused one of the physical memory blocks during the step (e4); and (e6) updating the mapping table for renewing the hash function, the logical set table, the physical memory set table, and the set status table of the mapping table.

4. The method of claim 3, during the step (e6), further comprising the steps of:

(e61) issuing an access command for accessing the flash memory by the host and writing the data to an assigned logical block address, or updating the data stored in the logical block address;

(e62) operating the logical block address for generating the logical set number and the inter-set number by the hash function;

(e63) inquiring the logical set table in the random access memory (RAM) based on the logical set number for generating the physical memory set number corresponding to the logical block address;

(e64) inquiring the physical memory set table based on the physical memory set number for generating the set status index of the physical memory set;

(e65) inquiring the set status table of the mapping table based on the set status index for generating a status presentation sequence of the physical memory set;

(e66) determining whether at least one unused physical memory block is located in the physical memory sets, wherein if no, proceed to step (e67), and if yes, proceed step (e70);

(e67) searching one unused physical memory set;

(e68) copying the effective data of the physical memory block in the physical memory set to the unused physical memory set, releasing the physical memory set, and updating the logical set table and the physical memory set table;

(e69) searching unused one of the physical memory blocks in the unused physical memory set;

(e70) writing the new data to the unused one of the physical memory blocks;

(e71) constructing the status presentation sequence based on the updated set status; and (e72) updating the physical memory set table.

5. The method of claim 1, during the step (f), further comprising the steps of:

(f1) issuing an access command by a host to access the flash memory and reading the data from an assigned logical block address;

(f2) operating the logical block address by a hash function for generating the logical set number and the inter-set number;

(f3) inquiring the logical set table in the random access memory (RAM) based on the logical set number during the step (f2) for generating the physical memory set number corresponding to the logical block address;

(f4) inquiring the physical memory set table based on the physical memory set number during the step (f3) for generating the set status index of the physical memory set;

(f5) inquiring the set status table based on the set status index during the step (f4) for generating a status presentation sequence of the physical memory set;

(f6) searching the status presentation sequence to determine whether at least one value of the status presentation element in the status presentation sequence is the same as the inter-set number in the sets, wherein if yes, proceed step (f7), and if no, proceed to the step (61);

(f61) reporting errors or returning the data size of an empty block, and proceeding to end; and (f7) reading the data on the block "i-th" and returning the data if the value in the status presentation element "i-th" is the same as the inter-set number.

* * * * *